United States Patent [19]

Shimizu

[11] Patent Number: 4,803,679
[45] Date of Patent: Feb. 7, 1989

[54] COMMUNICATION NETWORK CAPABLE OF AUTOMATICALLY INFORMING A SUBSCRIBER OF OCCURRENCE OF AN IDLE CHANNEL

[76] Inventor: Toshimitsu Shimizu, c/o NEC Corporation, 33-1, Shiba 5-chome, Minato-ku, Tokyo, Japan

[21] Appl. No.: 36,520

[22] Filed: Apr. 9, 1987

[30] Foreign Application Priority Data

Apr. 9, 1986 [JP] Japan ................................ 61-81894
May 9, 1986 [JP] Japan ................................ 61-104970

[51] Int. Cl.⁴ .............................................. H04J 3/16
[52] U.S. Cl. ........................................ 370/95; 379/58; 455/56
[58] Field of Search .................. 370/95, 104; 455/33, 455/34, 54, 56; 379/58, 59, 60

[56] References Cited

U.S. PATENT DOCUMENTS

| | | | |
|---|---|---|---|
| 4,400,585 | 8/1983 | Kaman et al. | 455/34 |
| 4,414,661 | 11/1983 | Karlstrom | 455/33 |
| 4,485,486 | 11/1984 | Webb et al. | 455/33 |

Primary Examiner—Douglas W. Olms
Assistant Examiner—Wellington Chin
Attorney, Agent, or Firm—Sughrue, Mion, Zinn, Macpeak and Seas

[57] ABSTRACT

In a communication network comprising a base station and a plurality of substations communicable with the base station through radio channels including a control channel, at least one of the substations comprises a memory unit (31) for storing an identification signal representative of an off-hook subscriber when no idle channel is found out in the radio channels. When an idle channel is detected by an idle channel detector (24), the identification signal is read out of the memory circuit to be sent to an idle channel notification circuit (32). The idle channel notification circuit automatically informs the off-hook subscriber of occurrence of the idle channel through a subscriber interface circuit (16) by the use of a specific ringing signal. Alternatively, the identification signal may be sent from the substation to the base station and returned back to the substation so as to avoid collision among off-hook subscribers.

6 Claims, 5 Drawing Sheets

COMMUNICATION NETWORK CAPABLE OF AUTOMATICALLY INFORMING A SUBSCRIBER OF OCCURRENCE OF AN IDLE CHANNEL

BACKGROUND OF THE INVENTION

This invention relates to a communication network comprising a station which accommodates a plurality of subscribers to selectively connect the subscribers to output channels. Although a multi direction time division multiple X (MD-TDM) radio communication network will mainly be described as the communication network, this invention is applicable to any other wire communication network.

A TDM radio communication network of the type described comprises a base or control station and a plurality of stations which may be called substations or local stations and which are communicable with the base station through a sequence of output channels. In such a TDM radio communication network, the output channel sequence may be a sequence of radio channels and is divisible into up-link and down-link channel sequences which are directed from the substations towards the base station and from the base station towards the substations, respectively. Both-way or bidirectional communication is carried out between a pair of subscribers accommodated in the substation or substations by seizing and occupying one of the up-link channels and one of the down-link channels.

In the above-mentioned radio communication network, it is assumed that one of the subscribers goes off-hook when all of the up-link and the down-link channels are occupied or used without any of the up-link and the down-link channels being idle. In this event, the subscriber in question, namely, an off-hook subscriber is supplied with a busy tone and should repeat off-hook again and again before an idle channel is found out. Therefore, invalid off-hook must often be separated by the subscriber under consideration before the subscriber can carry out communication. In addition, the subscriber in question might wait for occurrence of an idle channel in vain for an unpleasingly long term.

Under the circumstances, it is preferable to automatically inform or notify the subscriber in question of occurrence of such an idle channel.

Such automatic notification of occurrence of an idle channel might result in collision of off-hook when a plurality of off-hook subscribers wait for occurrence of the idle channel.

SUMMARY OF THE INVENTION

It is an object of this invention to provide a communication network wherein an off-hook subscriber can detect occurrence of an idle channel without repeating off-hook.

It is another object of this invention to provide a communication network of the type described which can automatically inform the off-hook subsrciber of occurrence of such an idle channel.

It is a further object of this invention to provide a communication network of the type described, which is favorably operable as a TDM radio communication network.

It is a still another object of this invention to provide a communication network wherein no collision takes place among off-hook subscribers.

A communication network to which this invention is applicable comprises a station which accommodates a plurality of subscribers to selectively connect the subscribers to output channels. The station comprises first detecting means for detecting whether or not a communicable one of said output channels is present, second detecting means for detecting off-hook states of the subscribers, and tone supplying means coupled to the first and the second detecting means for supplying a specific tone to an off-hook of the subscribers that is in the off-hook state when the off-hook subscriber is not communicable. According to this invention, the station comprises storage means coupled to the respective subscribers and to the first detecting means for storing an identification signal indicative of the off-hook subscriber when the off-hook subscriber is not communicable and informing means coupled to the storage means and the first detecting means for informing the off-hook subscriber of presence of the communicable output channel when the off-hook subscriber becomes communicable.

DESCRIPTION OF THE PREFERRED EMBODIMENTS

Figure 1:
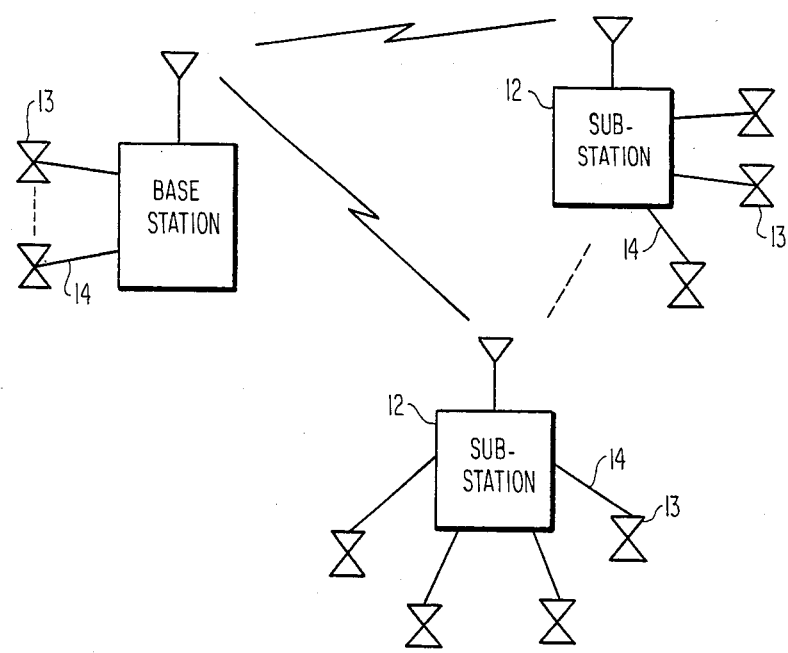
FIG. 1 is a block diagram of a communication network to which this invention is applicable.

Referring to FIG. 1, a conventional TDM radio communication network will be described for a better understanding of this invention. The TDM radio communication network comprises a base or control station 11 and a plurality of substations or local stations 12 which are communicable with the base station 11. Communication between the control station 11 and the substations 12 is carried out by the use of up-link and down-link TDM signals each of which is arranged in a sequence of radio channels. More specifically, the up-link TDM signal is composed of a sequence of up-link channels from each substation 12 to the base station 11 while the down-link TDM signal is composed of a sequence of down-link channels from the base station 11 towards the substations 12. Each of the up-link and the down-link channel sequences is subdivided into a succession of frames each of which is repeated at a predetermined period of, for example, 125 microseconds and which comprises a control channel and a plurality of communication channels. If suffices to say that an idle channel information signal is arranged by the base station 11 in the control channel of the down-link channel sequence so as to represent either absence or presence of an idle channel and a channel location of the idle channel.

Each of the substations 12 accommodates a plurality of subscribers 13 connected through subscriber lines 14 to the substations 12. Communication is possible between the subscribers 13 accommodated in the base station 11 and/or the substation or substations 12.

Figure 2:
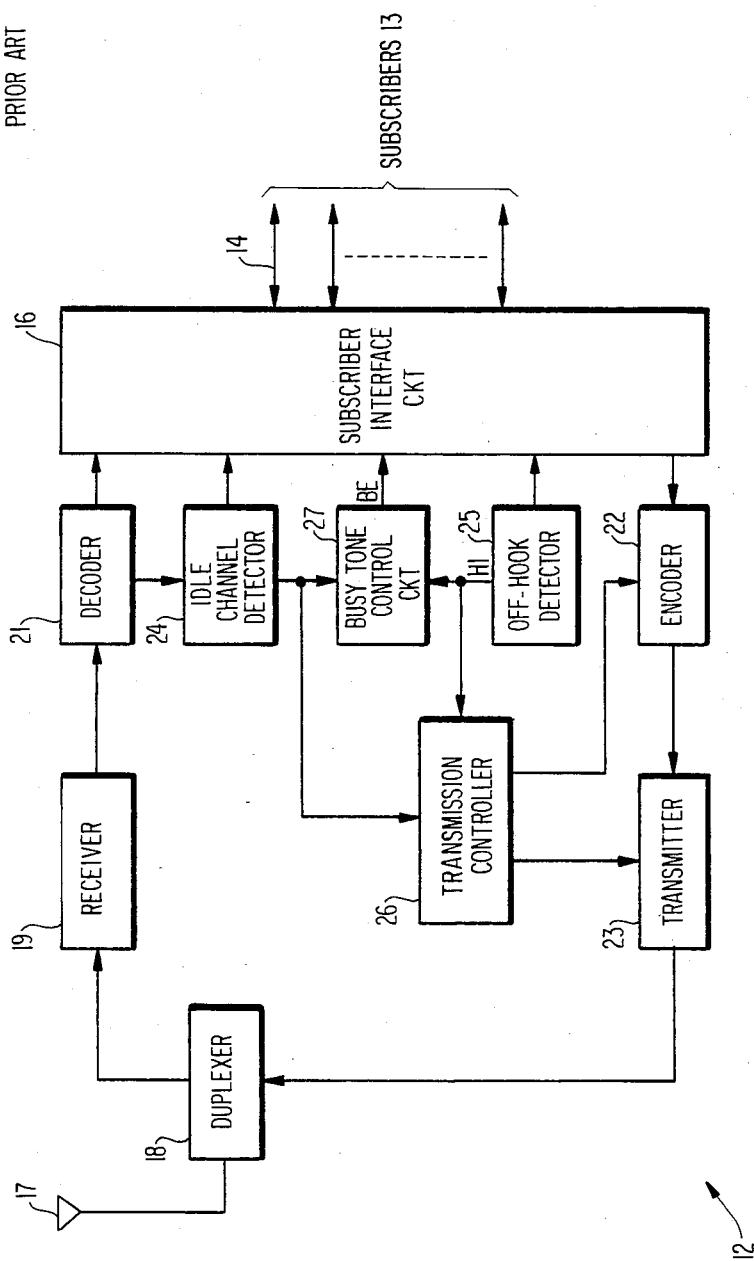
FIG. 2 is a block diagram of a conventional substation for use in the communication network as illustrated in FIG. 1.

Referring to FIG. 2 together with FIG. 1, the illustrated substation 12 comprises a subscriber interface circuit 16 connected through the subscriber lines 14 to the subscribers 13 (not shown in this figure) and an antenna 17 for transmitting and receiving the up-link and the down-link TDM signals. During usual communication, the down-link TDM signal is supplied through a duplexer 18 and a receiver 19 to a decoder 21 and is decoded by the decoder 21 into a decoded signal. The decoded signal is delivered to the subscribers 13 through the subscriber interface circuit 16 in a known manner.

On the other hand, a subscriber output signal is given from each subscriber 13 to the antenna 17 through the subscriber interface circuit 16, an encoder 22, and a transmitter 23 and is transmitted from the antenna 17 towards the base station 11 in the form of the up-link TDM signal during the usual communication.

As mentioned before, the control channel of the down-link channel sequence carries the idle channel information signal so as to indicate either absence or presence of an idle channel and the idle channel location. The idle channel information signal is monitored through the decoder 21 by an idle channel detector 24. As a result, the idle channel detector 24 detects either absence or presence of the idle channel and the idle channel location and may be called a first detection circuit. The idle channel detector 24 selectively produces an absence signal and a presence signal in the absence and the presence of the idle channel, respectively. In addition, the idle channel detector 24 also produces a location indication signal indicative of an idle channel location on detection of the idle channel.

An off-hook state of each subscriber is monitored through the subscriber interface circuit 16 by an off-hook detector 25 which may be called a second detection circuit. The off-hook detector 25 detects which one of the subscribers goes off-hook and produces an off-hook indication signal HI indicative of the detected subscriber.

Let a certain one of the subscribers go off-hook when at least one idle channel is present. In this event, the off-hook indication signal HI is sent from the off-hook detector 25 to a transmission controller 26. Simultaneously, the transmission controller 26 is supplied with the presence signal and the location indication signal from the idle channel detector 24. Consequently, the transmission controller 26 controls the encoder 22 and the transmitter 23 to assign the subscriber output signal produced from the subscriber in question to the idle channel detected by the idle channel detector 24. Thus, communication is started between the base station 11 and the substation 12.

Next, it is assumed that no idle channel is present in the radio channels due to an increase of traffic when a subscriber goes off-hook. In this case, the off-hook indication signal HI is supplied to a busy tone control circuit 27 together with the absence signal which is given from the idle channel detector 24 to indicate presence of no idle channel. Under the circumstances, the busy tone control circuit 27 produces a busy tone enable signal BE which enables production of a busy tone. Responsive to the busy tone enable signal BE, the subscriber interface circuit 16 delivers the busy tone to the subscriber in question. Thus, the subscriber knows on reception of the busy tone that all of the radio channels are being used.

With this structure, the subscriber in question should repeat off-hook again and again until any idle channel is found out because he or she can not instantly know about occurrence of any idle channel, as already described in the preamble of the instant specification.

Figure 3:
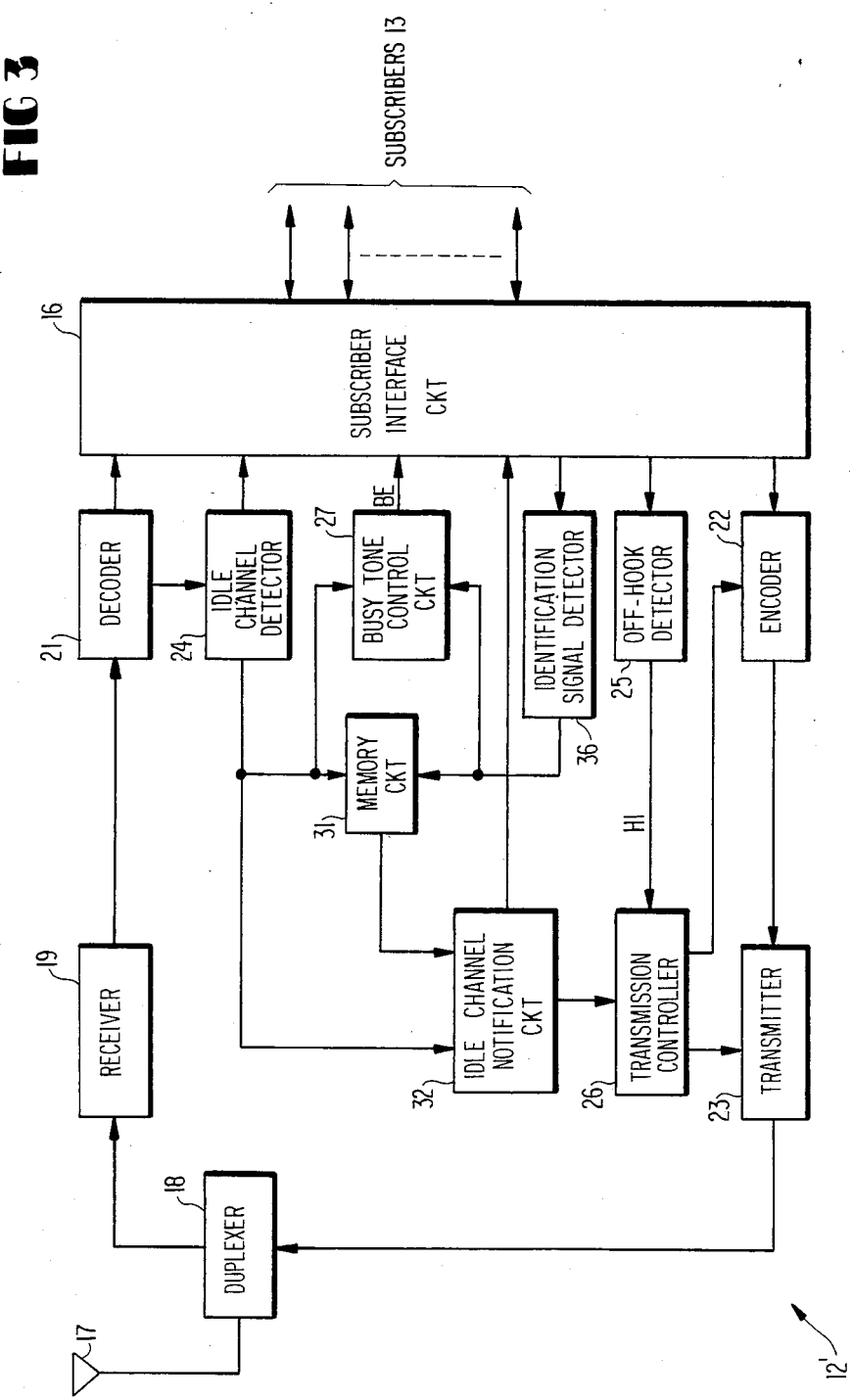
FIG. 3 is a block diagram of a substation for use in a communication network according to a first embodiment of this invention.

Referring to FIG. 3, a substation 12' according to a first embodiment of this invention is applicable to a communication network illustrated in FIG. 1 and comprises similar parts and signals designated by like reference numerals and symbols. The substation 12' illustrated in FIG. 3 comprises a memory circuit 31 coupled to the idle channel detector 24 and the off-hook detector 25 and an idle channel notification circuit 32 coupled to the memory circuit 31, the idle channel detector 24, and the transmission controller 26. The idle channel notification circuit 32 is also coupled to the subscriber interface circuit 16.

Moreover, it is to be noted that each subscriber can be detected by an identification signal detector 36 when the subscriber goes off-hook. In other words, the identification signal detector 36 can produce a detection signal representative of detection of an identification signal which specifies each subscriber. The identification signal is produced from the subscriber interface circuit 16 and is different from a directory number assigned to each subscriber.

The illustrated substation 12' is operable in a manner similar to that illustrated in FIG. 2 when any idle channel is present in the radio channels. Therefore, the following description will be made on the assumption that no idle channel is present when a certain one of the subscribers goes off-hook. In this case, the idle channel detector 24 detects absence of any idle channel by monitoring the control channel of the down-link channel sequence and delivers the absence signal to both the bush tone control circuit 27 and the memory circuit 31. The off-hook detector 25 also delivers the off-hook indication signal HI as the identification signal to both the bush tone control circuit 27 and the memory circuit 31 in response to the off-hook of the subscriber in question or off-hook subscriber. Responsive to the off-hook indication signal HI and the absence signal, the busy tone control circuit 27 produces the busy tone enable signal BE so as to inform the subscriber in question of presence of no idle radio channels in the manner mentioned in conjunction with FIG. 3.

On the other hand, the memory circuit 31 is enabled in response to the absence signal and stores the identification signal. The memory circuit 31 may have a plurality of addresses for storing a plurality of identification signals, respectively, and may be of a first-in first-out type. Such stored identification signals are selectively read out of the memory circuit 31 one by one.

After storage of the identification signal of the subscriber in question, let an idle channel take place in the radio channels. Under the circumstances, the idle channel detector 24 produces the presence signal representative of presence of the idle channel. The memory circuit 31 is accessed by the presence signal to produce one of the stored identification signals. The one stored identification signal is assumed to specify the identification signal of the off-hook subscriber in question and may be called a specific identification signal. On the other hand, the idle channel notification circuit 32 is supplied from the idle channel detector with the idle channel location signal representative of the idle channel location of the idle channel under consideration.

Responsive to the specific identification signal, the idle channel notification circuit 32 informs the subscriber interface circuit 16 of occurrence of the idle channel. The subscriber interface circuit 16 sends a ringing signal to the subscriber specified by the specific identification signal when occurrence of the idle channel is informed. Thus, the off-hook subscriber knows that he or she can do off-hook. Such a ringing signal may be a specific ringing signal different from a usual ringing signal produced on reception of a terminating call. Production of the specific ringing signal serves to distinguish occurrence of an idle channel from reception of a terminating call.

In addition, the idle channel location signal is supplied to the transmission controller 26. The subscriber output signal of the subscriber in question is located within a channel indicated by the idle channel location signal.

At any rate, a subscriber can momentarily know about occurrence of an idle channel and about probability of off-hook. This brings about efficient use of the radio channels.

Figure 4:
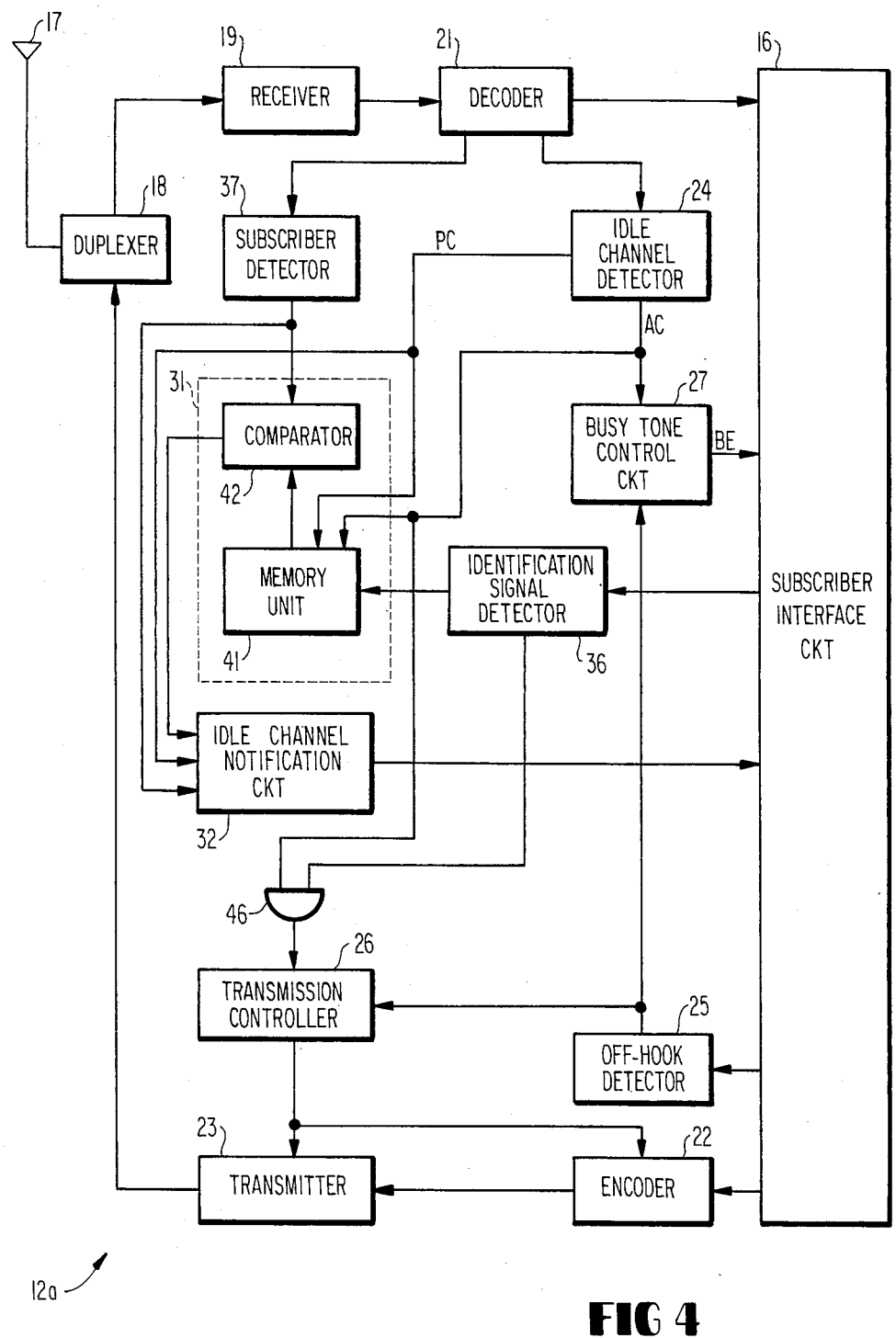
FIG. 4 is a block diagram of a substation for use in a communication network according to a second embodiment of this invention.
Figure 5:
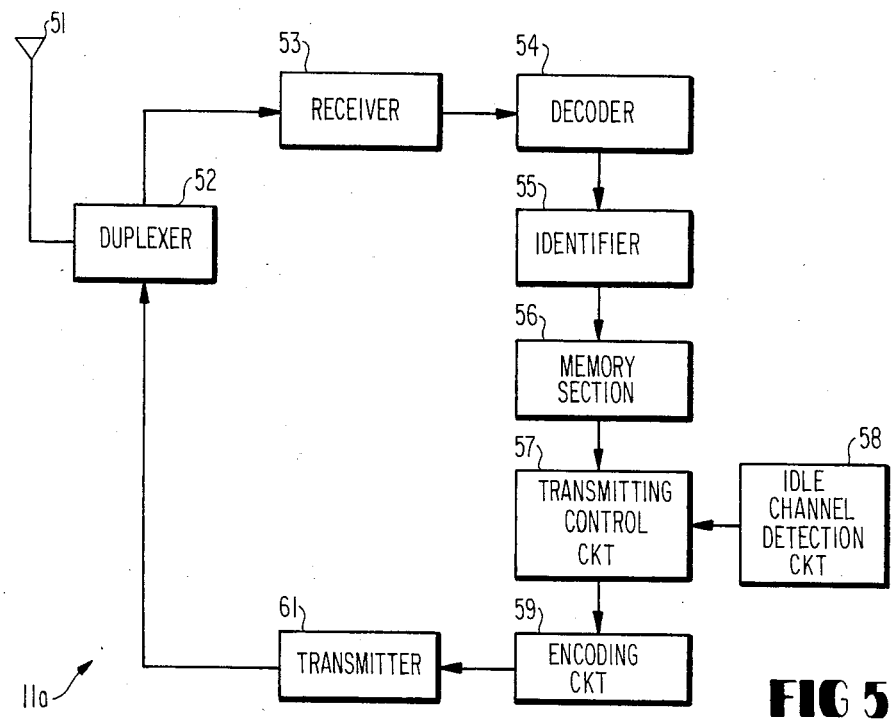
FIG. 5 is a block diagram of a base station communicable with the substation illustrated in FIG. 4.
Figure 6:
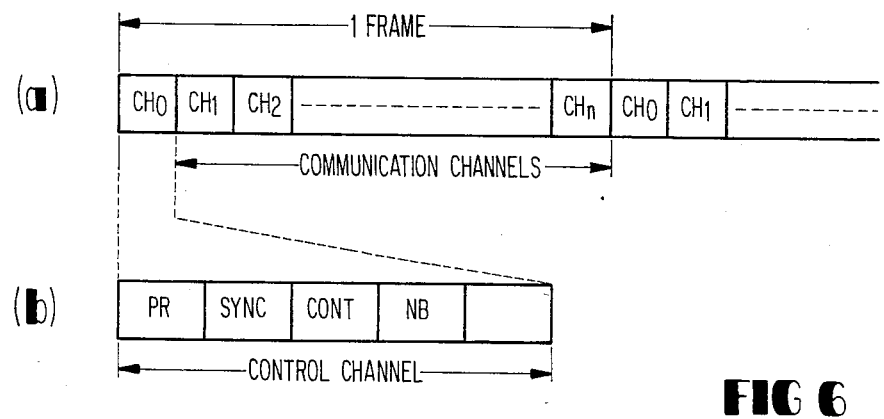
FIGS. 6(a) and (b) are time charts for use in describing operation of the substation and the base station illustrated in FIGS. 4 and 5.

Referring to FIGS. 4 through 6, a communication network according to a second embodiment of this invention comprises a plurality of substations 12a and a base station 11a which are illustrated in FIGS. 4 and 5, respectively.

Like in FIG. 3, when a subscriber goes off-hook in the presence of no idle channel, an identification signal is produced so as to specify the subscriber in question in the substation 12a wherein the subscriber in question is accommodated. The subscriber in question may be an off-hook subscriber or a waiting subscriber. In the example being illustrated, the identification signal is sent from the substation 12a to the base station 11a and is returned back from the base station 11a to the substation 12a under consideration when an idle channel is found out in the base station 11a.

The communication network illustrated in FIG. 4 serves to avoid collision between originating calls when a plurality of waiting subscribers are present, as will become clear as the description proceeds. This is because the illustrated communication network can prevent the waiting subscribers from using a single idle channel in a manner to be described later.

Communication is carried out between the substations 12a and the base station 11a by the use of a TDM signal which is illustrated in FIG. 6 and which may be recognized as either a down-link TDM signal or an up-link TDM signal.

As shown in FIG. 6(a), the illustrated TDM signal is composed of a sequence of channels which are divided into a sequence of frames repeated at a predetermined period. Each of the frames is subdivided into a control channel $CH_0$ and first through n-th communication channels $CH_1$ to $CH_n$ each of which is used in common to all of the substations under control of the baes station 11a. Description will mainly be made about the control channel $CH_0$ because the communication channels $CH_1$ to $CH_n$ may be similar to those known in the art.

In FIG. 6(b), the control channel $CH_0$ includes a preamble field PR, a synchronization field SYNC, a control field CONT, a specific number field NB, and another field. A preamble signal and a synchronization signal are arranged in the preamble and the synchronization fields PR and SYNC, respectively. A wide variety of control signals are located in the control field CONT to carry out transmission control, reception control, or the like. The control channel $CH_0$ may be referred to as an up control channel and a down control channel when the TDM signal is used as the up-link and the down-link TDM signals, respectively. In the control field CONT of the down control channel, either the absence or the presence signal is arranged to specify absence or presence of an idle channel together with the location indication signal, as described in conjunction with FIG. 3.

In the up control channel CONT, the identification signal of the waiting subscriber is arranged in the specific number of field NB. On the other hand, an indicated one of identification signals is placed by the base station 11a in the specific number field NB of the down control channel CONT when the base station 11a finds out an idle channel in a manner to be described later.

In FIG. 4, the illustrated substation 12a comprises similar parts and signals designated by like reference numerals and symbols so as to carry out operations in a manner similar to those described in conjunction with FIG. 3. The substation 12a further comprises an identification signal detector 36 coupled to the subscriber interface circuit 16. The identification signal detector 36 detects an identification signal of the off-hook subscriber. The identification signal is representative of an identification number assigned to each subscriber. From this fact, it is understood that the subscriber interface circuit 16 produces the identification signal in this embodiment. Such production of such an identification signal is possible by the use of a known circuit of the subscriber interface circuit 16 and will not be described any longer.

The idle channel detector 24 monitors the control field CONT of the down control channel included in the down-link TDM signal in a manner similar to that described in conjunction with FIG. 3. Furthermore, the illustrated idle channel detector 24 selectively produces absence and presence signal which are depicted at AC and PC, respectively, and which are representative of absence and presence of an idle channel, respectively. The location indication signal is also produced by the idle channel detector 24 to specify a location of an idle channel.

The specific number field NB (FIG. 6) of the down control channel is further monitored by a subscriber detector 37 which may be referred to as a third detection circuit and which serves to detect the indicated identification signal indicated by the base station 11a and received by the substation 12a, as will later become clear. Such a detected identification signal may be called a reception identification signal and is sent to the memory circuit 31.

The illustrated memory circuit 31 comprises a memory unit 41 for successively memorizing the identification signal of each off-hook subscriber in response to the absence signal AC sent from the idle channel detector 24. The identification signal of the off-hook subscriber is sent from the subscriber interface circuit 16 through the identification signal detector 36 and is read out of the memory unit 41 as a memorized identification signal in response to the presence signal PC. The memorized identification signal is sent to a comparator 42 and is compared with the reception identification signal by the comparator 42. When coincidence is detected between the memorized and the reception identification signals, the comparator 42 puts the idle channel notification circuit 32 into an active state. As a result, the idle channel notification circuit 32 informs the subscriber interface circuit 16 of occurrence of an idle channel and a location of the idle channel.

The absence signal AC and the identification signal of the off-hook subscriber are supplied to an AND gate 46 connected to the transmission controller 26. When the absence signal AC takes a logic "1" level, the identification signal of the off-hook subscriber is positioned within the specific number field NB of the up control channel and is sent through the duplexer 18 and the antenna 17 to the base station 11a. In this connection, a combination of the AND gate 46, the transmission controller 26, and the transmitter 23 may be referred to as a transmitting circuit for transmitting the identification signal through the up control channel.

In FIG. 5, the up-link TDM signal is transmitted to the base station 11a and is received through an antenna 51, a duplexer 52, and a receiver 53 to be sent to a decoder 54. At any rate, the decoder 54 produces a sequence of decoded signals which are derived from the up-link TDM signal and which are delivered to an identifier 55 for monitoring the specific number field NB of the up control channel to detect the reception identification signal sent from the substation 12a in question through the up control channel. The identification signal is indicative of an identification number of the off-hook subscriber and is supplied from the identifier 55 as a detected identification signal to a memory section 56. The detected identification signal is read out of the memory section 56 to be delivered to a transmitting control circuit 57 under control of an idle channel detection circuit 58.

The idle channel detection circuit 58 supervises the up-link and the down-link TDM signals to detect presence or absence of an idle channel or channels, or occurrence thereof. Therefore, the idle channel detection circuit 58 may be, for example, a central processing unit. On detection of an idle channel, the idle channel detection circuit 58 informs the transmitting control circuit 57 of a channel number assigned to the idle channel in question. The transmitting control circuit 57 controls an encoding circuit 59 to arrange the channel number of the idle channel in the control field CONT of the down control channel. Thereafter, the detected identification signal is read out of the memory section 56 as a readout identification signal. The readout identification signal is located in the specific number field NB of the down control channel. At any rate, the readout identification signal indicates one of the subscribers that can carry out transmission. Thus, the readout identification signal is assigned to the specific number field NB as the indicated identification signal and is sent through a transmitter 61, the duplexer 52, and the antenna 51 to the substation 12a.

A combination of the transmitting control circuit 57 and the encoding circuit 59 may be called a transfer circuit for transferring the readout identification signal towards the substation 12a.

In operation, let a certain one of the subscribers go off-hook in the presence of no idle channel. In this event, the off-hook detector 25 in FIG. 4 detects an off-hook state of the subscriber in question to produce an off-hook detection signal representative of detection of the off-hook of the subscriber. The off-hook detection signal is delivered from the off-hook detector 25 to both the busy tone control circuit 27 and the transmission controller 26.

The busy tone control circuit 27 is supplied with the absence signal AC from the idle channel detector 24 in addition to the off-hook detection signal when no idle signal is present. Accordingly, the busy tone control circuit 27 produces a busy tone enable signal be like in FIG. 3. As a result, the subscriber interface circuit 16 sends the off-hook subscriber a specific busy tone different from a normal busy tone. Such a specific busy tone may specify that all the radio channels are busy.

On the other hand, the identification signal of the off-hook subscriber is sent from the subscriber interface circuit 16 and is detected by the identification signal detector 36 to be stored in the memory unit 41 on one hand and to be delivered to the AND gate 46 on the other hand. Inasmuch as the AND gate 46 is enabled by the absence signal AC, the identification signal is sent through the AND gate 46 to the transmission controller 26 supplied with the off-hook detection signal and is located within the specific number field NB of the up control channel.

In the base station 11a illustrated in FIG. 5, the identification signal of the off-hook subscriber is stored through the identifier 55 in the memory section 56. The memory section 56 may store a plurality of identification signals.

Let an idle channel be detected by the idle channel detection circuit 58 as a result of completion of communication between any other subscribers. In this case, one of the identification signals is read out of the memory section 56 as the readout identification signal with the channel number of the idle channel indicated by the idle channel detection circuit 58. The one identification signal is thus located in the specific number field NB of the down control channel and is sent to the substations 12a. For brevity of description, the one identification signal is identical to the identification signal of the off-hook subscriber in question.

In addition, an idle channel presence signal and an idle channel location signal are located in the control field CONT of the down control channel so as to represent presence of an idle channel and a channel number or location of the idle channel.

In the substation 12a illustrated in FIG. 4, the idle channel detector 24 monitors the control field CONT of the down control channel to produce the presence signal PC as a result of detection of the idle channel presence signal located in the control field CONT. The presence signal PC is delivered to the memory unit 41 as a readout instruction to put the same into a readout state. The idle channel location signal is also detected by the idle channel detector 24 to be sent to the idle channel notification circuit 32.

The subscriber detector 37 monitors the specific number field NB to detect a specific one of the identification signals located in the specific number field NB of the down control channel. The specific identification signal is compared by the comparator 42 with the identification signal of the off-hook subscriber read out of the memory unit 41.

When coincidence is detected between the specific identification signal and the readout identification signal, the comparator 42 supplies the idle channel notification circuit 32 with a coincidence signal representative of the coincidence therebetween. The idle channel notification circuit 32 informs the subscriber interface circuit 16 of the idle channel location signal detected by the idle channel detector 24. The specific identification signal indicated by the base station 11a is also delivered from the subscriber detector 37 through the idle channel notification circuit 32 to the subscriber interface circuit 16.

Responsive to the specific identification signal and the idle channel location signal, the subscriber interface circuit 16 sends a specific ringing signal to a subscriber line specified by the one identification signal. The specific ringing signal is different from the usual ringing signal, as mentioned in conjunction with FIG. 3, and can therefore be distinguished from the usual ringing signal. Thus, distinction is possible between occurrence of an idle channel and a terminating call.

It is assumed that a lot of waiting subscribers are waiting for communication in the communication system. In this event, each identification signal sent from the base station 11a may include a priority signal representative of a degree of priority. In this event, the base station can select only one of the subscribers on detection of an idle channel and informs the one subscriber alone of occurrence of the idle channel. Therefore, it is possible to avoid collision among the subscribers.

While this invention has thus far been described in conjunction with a few embodiments thereof, it will readily be possible for those skilled in the art to put this invention into practice in various other manners. For example, the substation 12' or 12a may be connected to another station through communication wires which determine output channels and which define communicable channels when the communication wires are not busy. All of substations in the communication network may not always be identical with the substation 12' or 12a illustrated in FIGS. 3 and 4. This means that at least one of the substations alone may automatically inform each subscriber of occurrence of an idle channel.

What is claimed is:

1. In a communication network comprising a station which accommodates a plurality of subscribers and to which a plurality of output channels are assigned, said subscribers carrying out communication through said station and said output channels, said station comprising first detecting means for detecting whether or not an idle one of said output channels is present, second detecting means for detecting off-hook states of said subscribers, and tone supplying means coupled to said first and said second detecting means for supplying a specific tone to an off-hook one of said subscribers that is in the off-hook state when no idle channel is detected by said first detecting means, the improvement wherein said station comprises:
   storage means coupled to the respective subscribers and to said first detecting means for storing an identification signal indicative of said off-hook subscriber when no idle channel is detected by said first detecting means; and
   informing means, coupled to said storage means and said first detecting means, for informing said off-hook subscriber of presence of an idle channel when said idle channel is detected by said first detecting means.

2. A communication network as claimed in claim 1, said network comprising a base station and a plurality of substations each of which serves as said station and which is communicable with said base station through a sequence of radio channels operable as said output channels, wherein:
   said identification signal is stored in said storage means when said idle channel is not detected in said radio channels by said first detecting means on detection of said off-hook state of said off-hook subscriber.

3. A communication network as claimed in claim 2, said radio channel sequence being divisible into up-link and down-link sequences which are directed from said substations towards said base station and from said base station towards said substations, respectively, said up-link sequence comprising a sequence of up control channels while said down-link sequence comprises a sequence of down control channels, wherein at least one of said substations further comprises:
   transmitting means, coupled to said first and said second detecting means and responsive to said identification signal, for transmitting said identification signal through said up-control channels towards said base station when no idle channel is detected by said first detecting means on detecting said off-hook subscriber, said identification signal being sent back from said base station through said down control channels back to said at least one of the substations as a reception identification signal when an idle one of said radio channel sequence is found out; and
   third detecting means, responsive to said down control channels, for detecting said reception identification signal;
   said storage means comprising:
   memory means, coupled to said first detecting means, for memorizing said identification signal to produce said identification signal as a memorized identification signal when no idle channel is detected by said first detecting means;
   comparing means, coupled to said memory means and said third detecting means, for comparing said memorized identification signal with said reception identification signal to produce a coincidence signal when said reception identification signal is coincident with said memorized identification signal; and
   means for supplying said coincidence signal to said informing means so as to indicate the presence of an idle channel.

4. A communication network as claimed in claim 3, wherein said base station comprises:
   identification signal detecting means for detecting said identification signal through said up control channels as a detected identification signal;
   storing means for storing said detected identification signal to produce said detected identification signal as a stored identification signal;
   idle channel detecting means for detecting whether an idle one of said radio channels is present or absent;
   transferring means, coupled to said identification signal detecting means and said idle channel detecting means, for transferring said stored identification signal through said down control channels towards said substations when said idle radio channel is present.

5. A station for use in combination with a plurality of subscribers and a base station so as to carry out communication between a selected one of said subscribers and said base station through radio channels determined between said station and said base station, said station comprising first detecting means for detecting whether or not an idle one of said radio channels is present, second detecting means for detecting off-hook states of said subscribers, and tone supplying means, coupled to said first and said second detecting means, for supplying a specific tone to an off-hook one of said subscriber that is in the off-hook state, when absence of said idle channel is detected by said first detecting means, said station further comprising:

storage means, coupled to the respective subscribers and to said first detecting means, for storing an identification signal indicative of said off-hook subscriber when the absence of the idle channel is detected by said first detecting means on detection of the off-hook state of the off-hook subscriber; and informing means, coupled to said storage means and said first detecting means, for informing said off-hook subscriber of presence of said idle channel when the absence of the idle channel is detected by said first detecting means.

6. A base station for use in a radio communication network comprising a substation communicable with said base station through radio channels and a plurality of subscribers connected to said substation, and radio sequence being divisible into up-link and down-link sequences which are directed from said substation towards said base station and from said base station towards said substation, respectively, said up-link sequence comprising a sequence of up control channels while said down-link sequence comprises a sequence of down control channels, said substation transmitting, to said base station, an identification signal indicative of a selected one of said subscribers through said up-control channels when no idle channel is detected by said substation on off-hook of said selected subscriber, said base station comprising:

identification signal detecting means for detecting said identification signal sent through said up control channels as a detected identification signal;

storing means for storing said detected identification signal to produce said detected identification signal as a stored identification signal;

idle channel detecting means for detecting whether an idle one of said radio channels is present or absent; and transferring means, coupled to said identification signal detecting means and said idle channel detecting means, for transferring said stored identification signal through said down control channels towards said substations when said idle radio channel is present.

* * * * *

UNITED STATES PATENT AND TRADEMARK OFFICE
CERTIFICATE OF CORRECTION

PATENT NO. : 4,803,679
DATED : February 7, 1989
INVENTOR(S) : Toshimitsu Shimizu It is certified that error appears in the above-identified patent and that said Letters Patent is hereby corrected as shown below:

Please note that the Assignee of this patent is NEC Corporation, Tokyo, JAPAN.

Column 2, line 10, after "off-hook" insert --one--.
Column 2, line 62, delete "If" and insert --It--.
Column 4, line 39, delete "bush" and insert --busy--.
Column 4, line 42, delete "bush" and insert --busy--.

Signed and Sealed this

Twelfth Day of December, 1989

Attest:

JEFFREY M. SAMUELS

*Attesting Officer*    Acting Commissioner of Patents and Trademarks